United States Patent [19]

Yasui

[11] 4,438,424

[45] Mar. 20, 1984

[54] ELECTRIC APPARATUS FOR A VEHICLE SAFETY DEVICE

[75] Inventor: Toshio Yasui, Anjo, Japan

[73] Assignee: Nippondenso Co., Ltd., Kariya, Japan

[21] Appl. No.: 294,555

[22] Filed: Aug. 20, 1981

[30] Foreign Application Priority Data

Oct. 2, 1980 [JP] Japan ................................ 55-138141

[51] Int. Cl.³ .................................................. B60Q 1/00
[52] U.S. Cl. ................................... 340/52 H; 307/10 R; 280/735; 340/654
[58] Field of Search ............................... 340/52 H, 652; 307/10 R; 280/735

[56] References Cited

U.S. PATENT DOCUMENTS

| | | | |
|---|---|---|---|
| 3,890,594 | 6/1975 | Hosaka et al. | 340/52 H |
| 4,016,426 | 4/1977 | Nishioka | 340/52 H |
| 4,086,562 | 4/1978 | Hasegawa | 340/52 H |
| 4,220,871 | 9/1980 | Yasui et al. | 340/52 H |

Primary Examiner—David L. Trafton
Attorney, Agent, or Firm—Cushman, Darby & Cushman

[57] ABSTRACT

An electric apparatus for a vehicle safety device including an actuation recording apparatus for vehicle safety devices for protecting occupants in a vehicle during a crash thereof includes an internal power supply circuit and a plurality of circuits each thereof including a parallel connection of a resistor and an external recorder driving an electric circuit. The apparatus also includes connecting terminals for connection to a power source, external crash sensors, external initiators for vehicle safety devices and external recorders. The apparatus is fabricated as a unit in the form of an integrated circuit package.

7 Claims, 1 Drawing Figure

U.S. Patent  Mar. 20, 1984  4,438,424
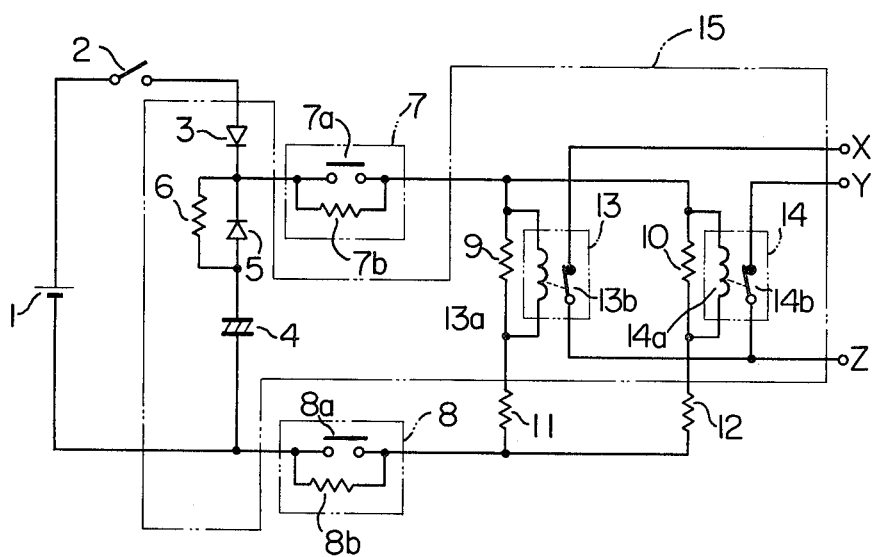

ELECTRIC APPARATUS FOR A VEHICLE SAFETY DEVICE

BACKGROUND OF THE INVENTION

1. Field of the Invention

The present invention relates to an electric apparatus for a vehicle safety device, and more particularly to the actuation of recording apparatus for vehicle safety devices which protect the occupants in a vehicle during a crash or collision of the vehicle. This invention further relates to a recording apparatus for enabling the discrimination between a case where a so-called percussion cartridge which is an initiator of an air-bag device for vehicles (hereinafter simply referred to as a squib) has misfired due to a trouble caused by static electricity or mechanical shock and a case where a squib has fired properly after the actual collision of the vehicle.

2. Description of the Prior Art

The vehicle safety devices here relate to an air-bag device which is a bag-shaped device to be installed in front of the driver's seat or any other occupant's seat in a vehicle. When a squib fires upon occurrence of a crash of the vehicle, the air-bag device is inflated to give a cushioning effect, thus performing a function of absorbing the impact force caused by a collision of the vehicle driver or other occupants against the structural member in front of his seat, thereby protecting the occupants. The operating principle of a known air-bag device is as follows. In the actuation circuit of the air-bag device including crash sensors, which are collision detecting devices responsive to a deceleration caused by a crash of a vehicle, and a squib as triggering means, if the contacts of the crash sensors are closed upon collision of the vehicle, an external power supply unit or a back-up power supply (e.g., one or more capacitors or an equivalent auxiliary power supply) in place of the external power supply unit should the latter has become inoperative, supplies power to the squib to make it fire an explosive, thereby actuating a gas generator and utilizing the produced gas pressure directly or indirectly to inflate an air-bag. While as a matter of course a vehicle safety device should ensure absolute safety for the vehicle occupants and the device must ensure a proper operation at the instant of a collision of the vehicle, it is also necessary for the vehicle safety device to prevent the occurrence of its malfunction during a normal operation of the vehicle which would otherwise cause an unexpected accident endangering the driver and other occupants. Thus, the construction of the electric circuit used in the device must have very high reliability. For this purpose, a measure is taken such that the electric circuit has a reduced number of components and necessary redundancy or the electric circuit is provided with a malfunction preventing device.

An example of prior art techniques of the above type is the electric circuit used in an actuation recorder for vehicle occupant protecting apparatus disclosed in U.S. Pat. No. 3,890,594. In accordance with the apparatus of this prior art invention, the voltage across a squib is monitored by the above-mentioned electric circuit and the apparatus includes a switch $SW_2$ which turns on by the actuation of the squib irrespective of whether the squib has fired properly or erroneously, a collision sensing switch $SW_1$ which turns off in response to a collision of the vehicle (e.g., a device which is mounted at a front part of the vehicle and comprises an element made of glass or the like material and coated with an electrically conductive material so as to be broken due to an impact caused by a collision of the vehicle), and a fuse which acts as a recorder.

However, the prior art apparatus of the above construction have the following disadvantages:

(1) If the battery is disconnected due to an impact caused by a collision of the vehicle, usually an electric current sufficient for the firing action is supplied to the squib from the back-up power supply capacitor (approximately, several thousands $\mu F$); however, after the firing by the squib, the voltage of the back-up capacitor becomes considerably low, so that it can no longer supply sufficient electric power to the electric circuit forming the switch $SW_2$ and the fuse acting as a recorder.

(2) Though there is used the collision sensing switch $SW_1$ which opens upon collision of the vehicle, if the magnitude of an impact force to which crash sensors are responsive differs from that which causes the collision sensing $SW_1$ to be opened, it is possible that the collision sensing device will fail to perform properly.

(3) Since the collision sensing switch $SW_1$ has to be used in addition to the crash sensors which are the components of the air-bag device for vehicles, the cost of the apparatus increases as a whole, but nevertheless its reliability deteriorates.

The present invention has been made with a view to overcoming the foregoing disadvantages of the prior art apparatus.

SUMMARY OF THE INVENTION

It is an object of the present invention to provide an electric apparatus for a vehicle safety device including an actuation recording apparatus for vehicle safety devices comprising a safety device which comprises a plurality of squib actuating and recorder driving circuits, which records which squib has fired properly and which squib has misfired, and furthermore, even if one or more of the squibs fails, still ensures an accurate operation for the remaining squib or squibs.

It is another object of the present invention to provide an electric apparatus for a vehicle safety device—including an actuation recording apparatus for vehicle safety devices—which employs a reduced number of component elements as a whole, has a reduced current consumption requirement, and is accurate and highly reliable in operation and low in cost.

It is still another object of the present invention to provide an electric apparatus for a vehicle safety device including an actuation recording apparatus for vehicle safety devices which is in the form of an encapsulated package unit having external output terminals for checking purposes, whereby the detection, monitoring, indication or recording of the actuation of the apparatus of this invention is attained only and simply through the use of the external output terminals and further the state of actuation of the apparatus and the state of recording after the actuation remains permanent while the package unit is sealed.

BRIEF DESCRIPTION OF THE DRAWING

The accompanying single drawing is a wiring diagram showing an embodiment of the present invention.

DESCRIPTION OF THE PREFERRED EMBODIMENTS

The present invention will now be described in greater detail with reference to the accompanying drawing.

The accompanying drawing is a circuit diagram showing an embodiment of the invention employing a pair of squibs. In the drawing, reference numeral 1 designates a battery installed in a vehicle, and 2 an ignition switch. Numeral 4 designates a back-up capacitor acting as an auxiliary power supply which is fully charged through a resistor 6 when the vehicle is in operation, and which ensures the supply of a necessary electric current to the apparatus of this invention even if any failure has occured in the battery power supply system upon collision of the vehicle. Numerals 3 and 5 designate diodes in which the diode 3 prevents the discharge current of the back-up capacitor 4 from flowing into the circuit of the ignition switch 2 and the diode 5 forms a quick discharge circuit for the back-up capacitor 4.

Numerals 11 and 12 designate squibs each of which, when energized, fires an explosive to inflate an air-bag, for example, and it is of the type comprising a heating wire having internal resistance of about 1 ohm. When fired, the squibs become open-circuited thereby to open electric circuits in which they are connected. Usually, these two squibs are used respectively to inflate air bags located in the driver's seat and the front passenger's seat, respectively.

Numerals 7 and 8 designate known crash sensors which detect a collision of the vehicle and close electric contacts 7a and 8a thereby establishing energizing circuits for both squibs 11 and 12.

Numerals 9 and 10 designate resistors nominally of about 1 ohm and the resistors are connected in series between the squibs 11 and 12 respectively, and the crash sensor 7 (or the crash sensor 8). The resistors are used to assure that, even when one of the squibs is short-circuited, a sufficient current for actuating the other squib may still be supplied.

Numerals 13 and 14 designate latching relays which function as recorders and whose relay coils 13a and 14a are respectively connected in parallel with the resistors 9 and 10. Relay contacts 13b and 14b have one end thereof connected to a common output terminal Z and the other end thereof respectively connected to output terminals X and Y. The output terminals X, Z and Y, Z are respectively connected as check terminals to external detecting monitoring, indicating or recording devices. Here, a latching relay comprises a relay contact or contacts which is operated to open or close by simply energizing an associated relay coil for a short time and which maintains an opened or closed state thereof even after the relay coil associated has been de-energized.

Further, the circuits comprising the diodes 3 and 5, the resistor 6, the back-up capacitor 4, the resistors 9 and 10, the latching relays 13 and 14 and the check terminals X, Y and Z are assembled into an encapsulated circuit package 15, and thus the apparatus of this invention is fabricated as a unit apparatus.

With the construction described above, the operation of the apparatus according to the present invention will now be described.

When a crash of the vehicle occurs while it is in operation, the contacts 7a and 8a of the crash sensors 7 and 8 are closed so that discharge currents from the battery 1 and the back-up capacitor 4 flow via a path formed by the crash sensor 7, the resistors 9 and 10, the squibs 11 and 12 and the crash sensor 8 to cause both squibs 11 and 12 to fire (this operation is hereinafter referred to as normal firing), thereby inflating their respective air-bags. In this case, a voltage higher than the operating voltage of the latching relays 13 and 14 is developed across the resistors 9 and 10, respectively, so that, in the case of the embodiment shown in FIG. 1, both relay contacts 13b and 14b are made to open thereby to establish an open-circuit between the check terminals X and Z and the check terminals Y and Z, respectively, thus indicating the occurrence of normal firing of both squibs 11 and 12.

Next, consider a case where a crash of the vehicle occurs after the squib 11 for the driver's seat, for example, has misfired due to static electricity, and impact applied to the squib itself, or the like. If a collision of the vehicle occurs after the squib 11 has become open-circuited due to its misfiring, the crash sensors 7 and 8 become closed but no current flows to the circuit of the latching relay 13 and consequently the relay 13 does not operate. On the other hand, the discharge currents from the battery 1 and the back-up capacitor 4 flow through the normal squib 12 for the assistant driver's seat via a path formed by the crash sensor 7, the resistor 10, the squib 12 and the crash sensor 8, thus causing the normal firing of the squib 12. In this case, the latching relay 14 is operated so that only its contact 14b is opened and only the check terminals Y and Z become open-circuited, thus establishing a record such that the squib 11 has misfired. In the event that a crash of the vehicle occurs after the squib 12 has misfired, only the check terminals X and Z become open-circuited. Further, if the vehicle is involved in a crash after both squibs 11 and 12 have misfired, then both of the check terminals X and Z and the check terminals Y and Z remain in the short-circuited state. Thus, in any case, it is possible to learn which one or ones of the squibs have misfired.

While, in the accompanying drawing, the latching relays are used as the recorders, they may be replaced by quick-operating thermal fuses each thereof having a resistance value which is sufficiently high as compared with that of the resistors 9 and 10.

It will thus be seen from the foregoing descriptions that the apparatus according to the present invention has the following remarkable advantages by virtue of its construction in which each of a plurality of squibs is connected in series with a resistor and each of the resistors is connected in parallel with a recorder.

(1) The recorders can be operated without fail by a current smaller than that required for the firing by the squibs.

(2) Crash sensors originally or already attached to a vehicle safety system can be used as the switches for detecting a crash of the vehicle.

(3) There is no possibility of deteriorating the reliability in the operation of a vehicle safety system itself due to the incorporative use of the recording apparatus of this invention.

(4) By suitably selecting the resistance value of a resistor connected in series with each of a plurality of squibs connected in parallel, even if one of the squibs is short-circuited, the remaining normal squib or squibs may be supplied with an electric current sufficient for its normal operation, so that it is possible to expect that normal firing by at least one of the squibs is assured thereby to elevate the reliability of the vehicle safety system.

(5) Since a corresponding recorder is connected to each of a plurality of squibs, it is possible to accurately determine which one or ones of the squibs have fired normally or misfired.

(6) Since the apparatus of this invention is fabricated as a unit in the form of an encapsulated circuit package 15, and since its external output terminals X, Y and Z are positioned outside of the circuit package 15, the detection, monitoring, indication or recording of any misfiring can be accomplished without opening the circuit package 15 and simultaneously the state of actuation of the apparatus of this invention and the state of recording after the actuation of the apparatus can be retained safely unless the circuit package 15 is opened, thus ensuring the credibility of the recording of normal firing or misfiring.

(7) The apparatus of the preferred embodiment of this invention shows the use of the squibs 11 and 12 in parallel connection. However, it is possible to use the squibs separately, one in connection with the crash sensor of the air-bag for the driver's seat and the other in connection with the crash sensor of the air-bag for the assistant driver's seat. Alternatively, both squibs may be used in connection with the respective crash sensors of the air-bag for the driver's seat. In the latter case, even if one of the squibs should fail, the other squib may still operate normally, thus increasing the redundancy thereby ensuring reliability and promoting the safety.

(8) It is well known in the prior art to connect a resistor in series with each squib so as to pick up the voltage drop developed across the resistor and supply it to a voltage detecting circuit for the purpose of monitoring. Here, each of the resistors 9 and 10 in the apparatus of this invention may be used as such a resistor to serve the purpose.

In this case, the two functions, i.e., the above-mentioned monitoring function and the proper checking function of the apparatus of this invention may be accomplished simultaneously without any increase in the number of components in the squib energizing circuits, thus ensuring improved efficiency and a high degree of reliability.

I claim:

1. An electric apparatus for a vehicle safety device including a power supply circuit, sensor means for sensing collision of a vehicle, and a plurality of triggering means fed by said power supply circuit through said sensor means for triggering at least one vehicle safety device upon actuation of said sensor means, said electric apparatus comprising:
   a plurality of resistors;
   a plurality of recorder means each thereof comprising electric circuit means connected in parallel with one of said plurality of resistors and for actuation by a high potential difference across said one of said plurality of resistors, the recorder means being actuated when a large electric current flows through said one of said plurality of resistors by way of an associated one of said plurality of triggering means upon the actuation of said sensor means, and permanently remains in the actuated state;
   said plurality of resistors having one end thereof connected in common to an end of said sensor means and the other end thereof connected to one of said plurality of triggering means and
   output terminals connected to outputs of said electric circuit means of said plurality of recorder means.

2. An apparatus according to claim 1, wherein each of said recorder means comprises a latching relay.

3. An apparatus according to claim 1, wherein each of said recorder means comprises a quick-operating thermal fuse.

4. An apparatus according to claim 1, wherein said power supply circuit comprises:
   a battery; and
   a back-up capacitor circuit having power supply output terminals and input terminals for connection in parallel with said battery, said back-up capacitor circuit comprising a series circuit of a back-up capacitor, a discharging diode and a charging resistor in parallel, and a charging diode.

5. An apparatus according to claim 4, wherein said plurality of resistors, said plurality of recorder means, said output terminals, and said back-up capacitor circuit of said power supply circuit are fabricated as a unit in the form of an integrated circuit package.

6. An apparatus according to claim 5, wherein said circuit package is an encapsulated circuit package.

7. An electric apparatus for a vehicle safety device including a power supply circuit, a plurality of sensor means for sensing collision of a vehicle, and a plurality of triggering means fed by said power supply circuit through said sensor means for triggering at least one vehicle safety device upon actuation of said sensor means, said electric apparatus comprising:
   a plurality of record means each thereof comprising electric circuit means connected in parallel with one of said plurality of resistors and for actuation by a high potential difference across said one of said plurality of resistors, the recorder means actuates when a large electric current flows through said one of said plurality of resistors by way of an associated one of said plurality of triggering means upon the actuation of said sensor means and permanently remains in the actuated state;
   a plurality of resistors each thereof connected to one of said electric circuit means of one of said plurality of recorder means, and having one end thereof connected in common to an end of one of said plurality of sensor means and the other end thereof connected to an end of another one of said plurality of sensor means by way of one of said plurality of triggering means;
   output terminals connected to said outputs of said electric circuit means of said plurality of recorder means, respectively; and
   a back-up capacitor circuit comprising a portion of said power supply circuit and having input terminals for connection in parallel with a battery and power supply, and output terminals connected to the other end of said one and said another one of said plurality of sensor means, respectively, said back-up capacitor circuit comprising a series circuit of a back-up capacitor, a discharging diode and a charging resistor in parallel, and a charging diode,
   wherein said plurality of recorder means, said plurality of resistors, said output terminals, and said back-up capacitor circuit are fabricated as a unit in the form of an integrated circuit package.

* * * * *